DECODING MAGNETIC INFORMATION FROM THE BEAD WIRES OF A TIRE

Filed Dec. 12, 1960

INVENTOR.
FREDERICK TOURTELLOTTE
BY Charles A. Blank
ATTORNEY.

INVENTOR.
FREDERICK TOURTELLOTTE
BY Charles A. Black
ATTORNEY.

April 20, 1965 F. TOURTELLOTTE 3,179,929

DECODING MAGNETIC INFORMATION FROM THE BEAD WIRES OF A TIRE

Filed Dec. 12, 1960 6 Sheets-Sheet 3

INVENTOR.
FREDERICK TOURTELLOTTE
BY Charles A. Blank
ATTORNEY.

April 20, 1965 F. TOURTELLOTTE 3,179,929

DECODING MAGNETIC INFORMATION FROM THE BEAD WIRES OF A TIRE

Filed Dec. 12, 1960 6 Sheets-Sheet 4

INVENTOR.
FREDERICK TOURTELLOTTE
BY Charles A. Blank
ATTORNEY.

April 20, 1965 F. TOURTELLOTTE 3,179,929

DECODING MAGNETIC INFORMATION FROM THE BEAD WIRES OF A TIRE

Filed Dec. 12, 1960 6 Sheets-Sheet 5

INVENTOR.
FREDERICK TOURTELLOTTE
BY Charles A. Blank
ATTORNEY.

April 20, 1965 F. TOURTELLOTTE 3,179,929

DECODING MAGNETIC INFORMATION FROM THE BEAD WIRES OF A TIRE

Filed Dec. 12, 1960 6 Sheets-Sheet 6

INVENTOR.
FREDERICK TOURTELLOTTE
BY Charles A. Blank

ATTORNEY.

United States Patent Office 3,179,929
Patented Apr. 20, 1965

3,179,929

DECODING MAGNETIC INFORMATION FROM THE BEAD WIRES OF A TIRE

Frederick Tourtellotte, Royal Oak, Mich., assignor to United States Rubber Company, New York, N.Y., a corporation of New Jersey Filed Dec. 12, 1960, Ser. No. 75,179
3 Claims. (Cl. 340—174.1)

This invention relates to a system for recording information on a member of a tire and for deriving the information therefrom and, more particularly, to coding and decoding apparatus useful in the system.

Tires having magnetically coded bead wires and methods of and apparatus for coding the same have been described and claimed in Patent 2,920,674, Bull. The present invention relates to an improved system for coding and decoding the magnetization of such bead wires.

It is an object of the invention to provide a new and improved system for recording information on a member of a tire and for deriving the information therefrom.

It is another object of the present invention to provide a new and improved apparatus for decoding a digital magnetic code on a member of a tire.

It is another object of the invention to provide a new and improved system of the type described capable of translating numerous information combinations.

In accordance with the invention, apparatus for decoding a digital magnetic code on a member of a tire comprises means responsive to the magnetic code for developing electrical code pulses representative thereof. The apparatus also includes means responsive to the position of the code pulses on the tire with respect to a reference point for separating the code pulses and for storing the separated pulses to represent individually the digits of the magnetic code.

For a better understanding of the present invention, together with other and further objects thereof, reference is made to the following description taken in connection with the accompanying drawings, and its scope will be pointed out in the appended claims.

Referring to the drawings.

Figures 1, 8, 9:
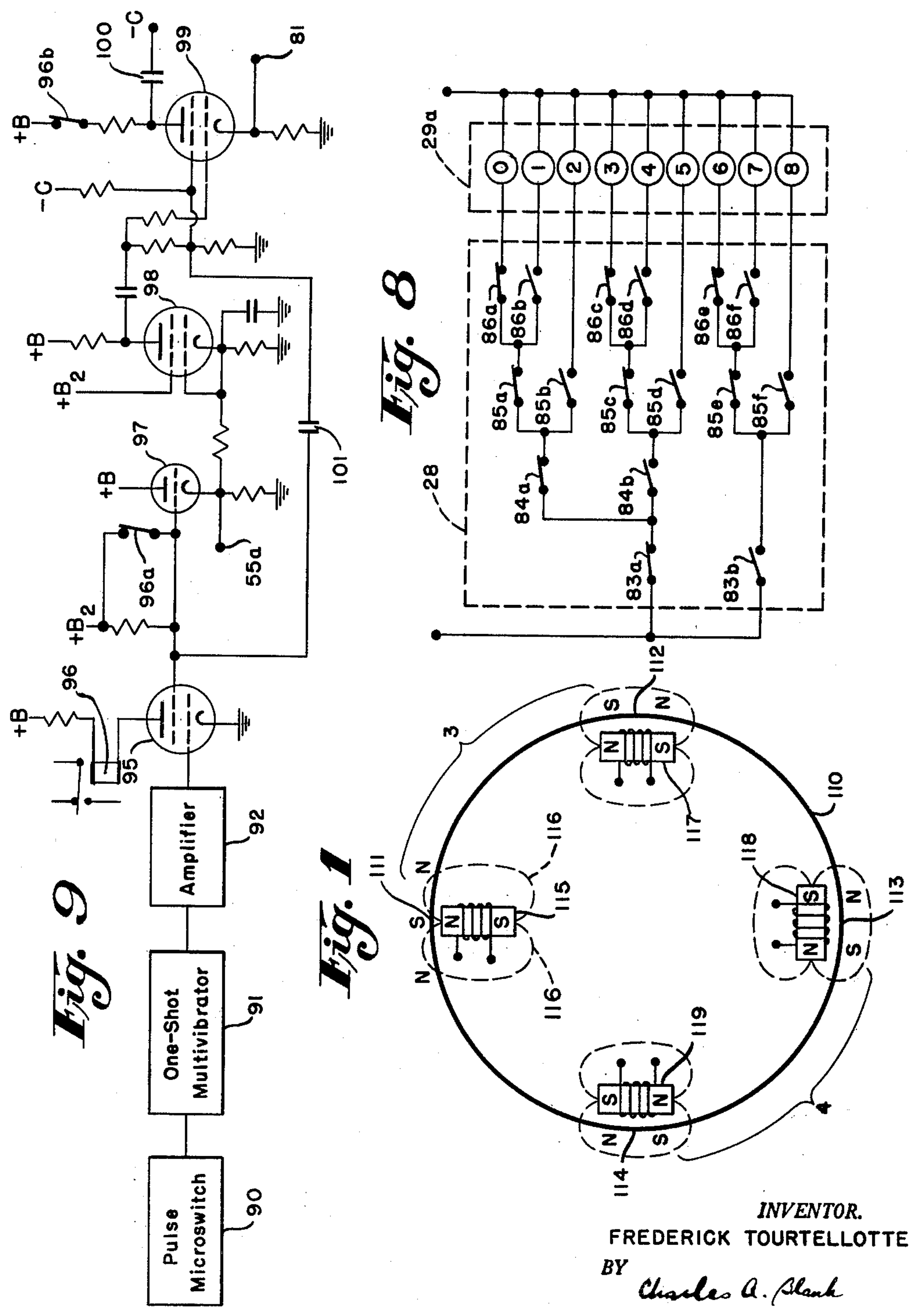
FIG. 1 is a schematic diagram of coding apparatus constructed in accordance with the invention.
FIG. 8 is a circuit diagram of a relay network of the FIG. 2 apparatus.
FIG. 9 is a circuit diagram, partly schematic, of a control unit of the FIG. 2 apparatus.

Referring now more particularly to FIG. 1 of the drawings, a steel bead wire bundle 110 of a tire is diagrammatically represented with magnetized regions 111, 112, 113 and 114 developed by means of suitable electromagnets positioned in proximity to the bead wire. As represented in the drawing, an electromagnet 115 is positioned radially of the bead wire with one pole of the magnet adjacent the bead wire, to develop the magnetic region 111 corresponding to an identification or indexing digit. Lines of flux are represented by the broken lines 116. The magnetic region 111 may have a South-North-South (SNS) polarity or the opposite polarity, namely, North-South-North (NSN) polarity, and thus the magnetic region 111 represents a binary digit. This digit establishes a reference point on the tire.

The other three magnetized regions may have a NS or a SN polarity or may be omitted to form digits of a ternary code. The electromagnets 117, 118, 119 are positioned longitudinally along the circumference of the bead wire so that both poles of each magnet are adjacent the bead wire and each corresponding magnetized portion of the bead wire includes a North and a South pole.

The other bead wire of the tire may also be magnetized with magnetic regions positioned along the circumference of the bead wire at the same positions as the magnetic regions represented in FIG. 1 and coded in accordance with the information to be transmitted. Preferably a ternary code digit is used at the four positions of the other bead wire and no indexing digit is necessary. The magnetized regions of the bead wire may individually have a length of, for example, 2 inches and a field strength of, for example, 15 gauss. Each magnetized region may have a NS or a SN polarity or may be omitted to form a digit of a ternary code.

Figure 2:
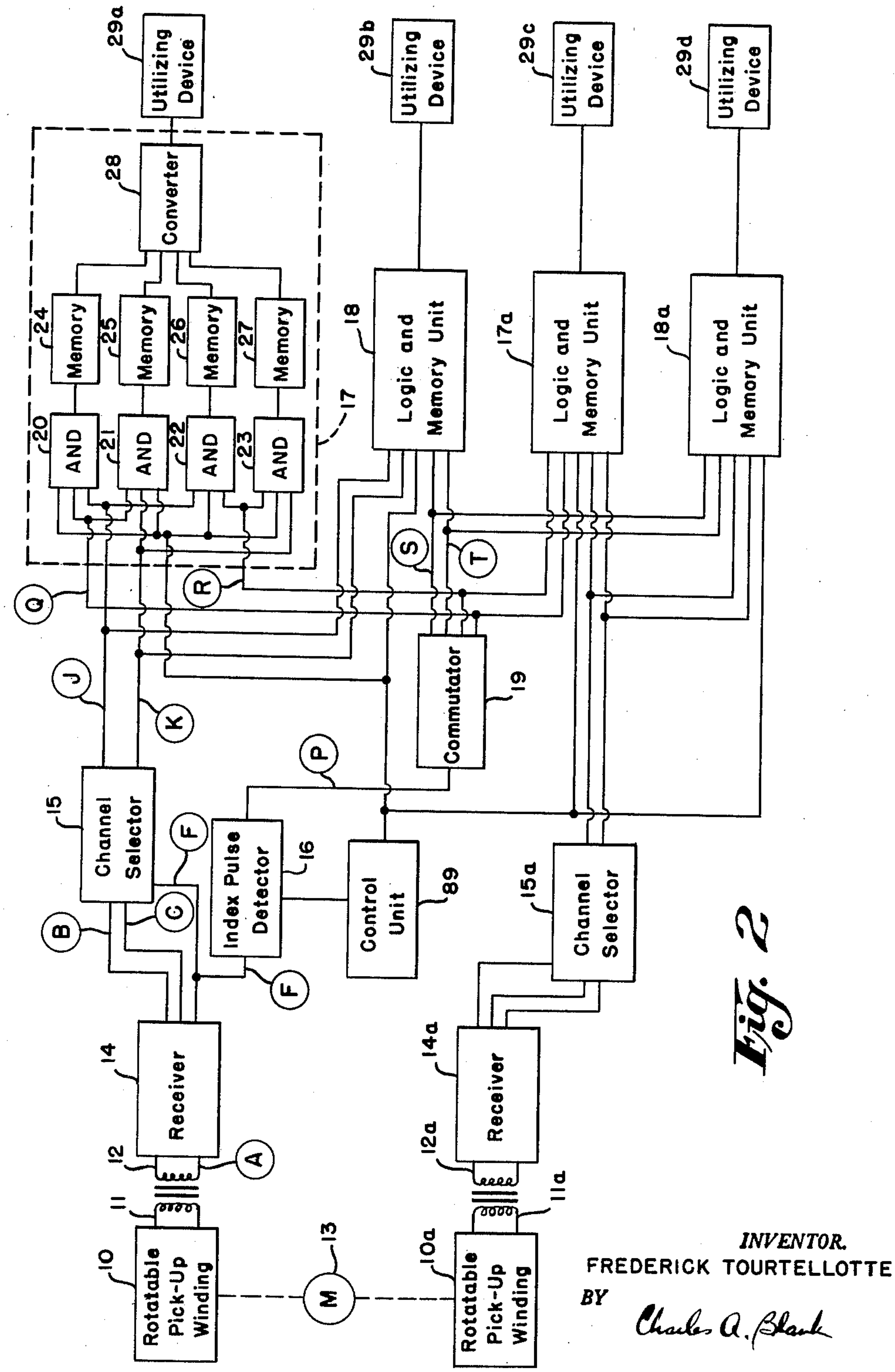
FIG. 2 is a schematic diagram of decoding apparatus constructed in accordance with the invention.

Referring now more particularly to FIG. 2 of the drawings, apparatus for decoding a digital magnetic code on a member of the tire comprises means responsive to the magnetic code for developing electrical code pulses representative thereof. This means preferably includes a pickup winding 10 rotatable in proximity to the tire bead wire and including a transformer having a rotatable primary winding 11 coupled to the pickup winding and having a secondary winding 12. The apparatus includes means comprising a synchronous motor 13 for rotating the pickup winding and the primary winding at, for example, 3,600 revolutions per minute to translate the electrical code pulses to the secondary winding. The pickup winding and rotatable transformer preferably are of a type described in detail in my application entitled "Automatic Signal Translating Apparatus," Serial No. 19,354, filed April 1, 1960, now Patent 3,160,865. A receiver 14, including wave-shaping and amplifying means for substantially eliminating noise signals from the pulses, is coupled to the secondary winding 12 for translating the electrical code pulses.

The apparatus also includes means responsive to the position of the code pulses on the tire with respect to a reference point for separating the code pulses and for storing the separated pulses to represent individually the digits of the magnetic code. More particularly, the pulse-separating and storing means includes a channel selector 15 and an index-pulse detector 16 coupled to the receiver 14. The channel selector 15 applies the derived ternary code pulses to logic and memory units 17 and 18. The index pulse detector 16 applies the index pulse to a commutator unit 19 responsive to the indexing digit for developing sequential timing pulses representative of the occurrence times of the code pulses.

The pulse separating and storing means also includes means responsive to the electrical code pulses and to the timing pulses for separating and storing pulses. More particularly, this means comprises logic and memory units 17 and 18. The logic and memory units 17 includes four AND circuits 20, 21, 22 and 23 coupled through four memory circuits 24, 25, 26 and 27, respectively, to a ternary to nonary converter 28. The output circuit of the converter 28 is connected to a suitable utilizing device 29*a*, such as an indicating lamp, a solenoid controlling a sorter mechanism, or information storage circuit for data processing.

The construction of the logic and memory unit 18 and the connections of that unit to the commutator and channel selector are similar to the construction and connections of unit 17.

The FIG. 2 apparatus also includes a second channel similar to the first channel and synchronously operative therewith for deriving the information from the other bead wire of the tire. Similar units are indicated by corresponding reference numerals.

Figure 3:
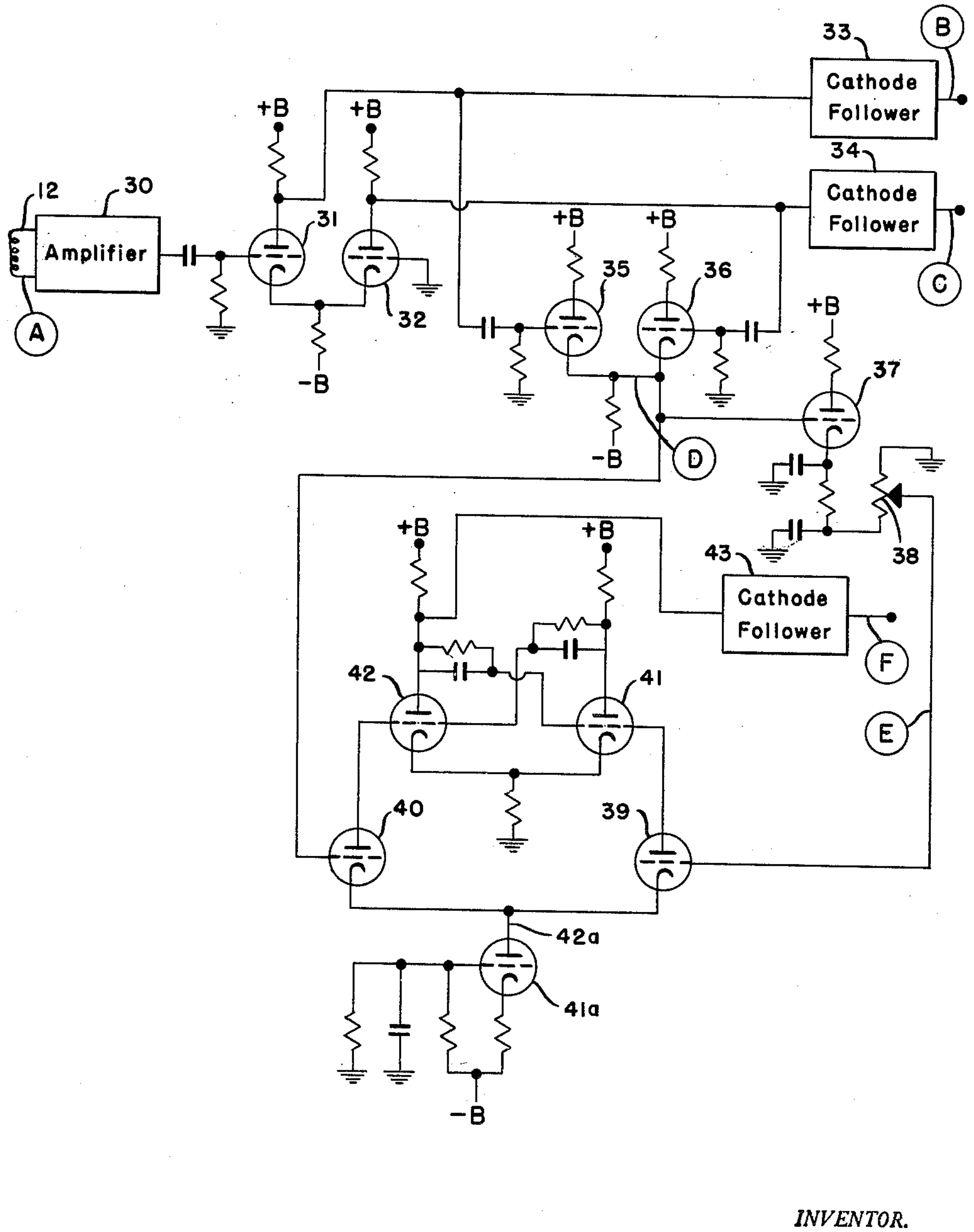
FIG. 3 is a circuit diagram, partly schematic, of a receiver portion of the FIG. 2 decoding apparatus.
Figure 10:
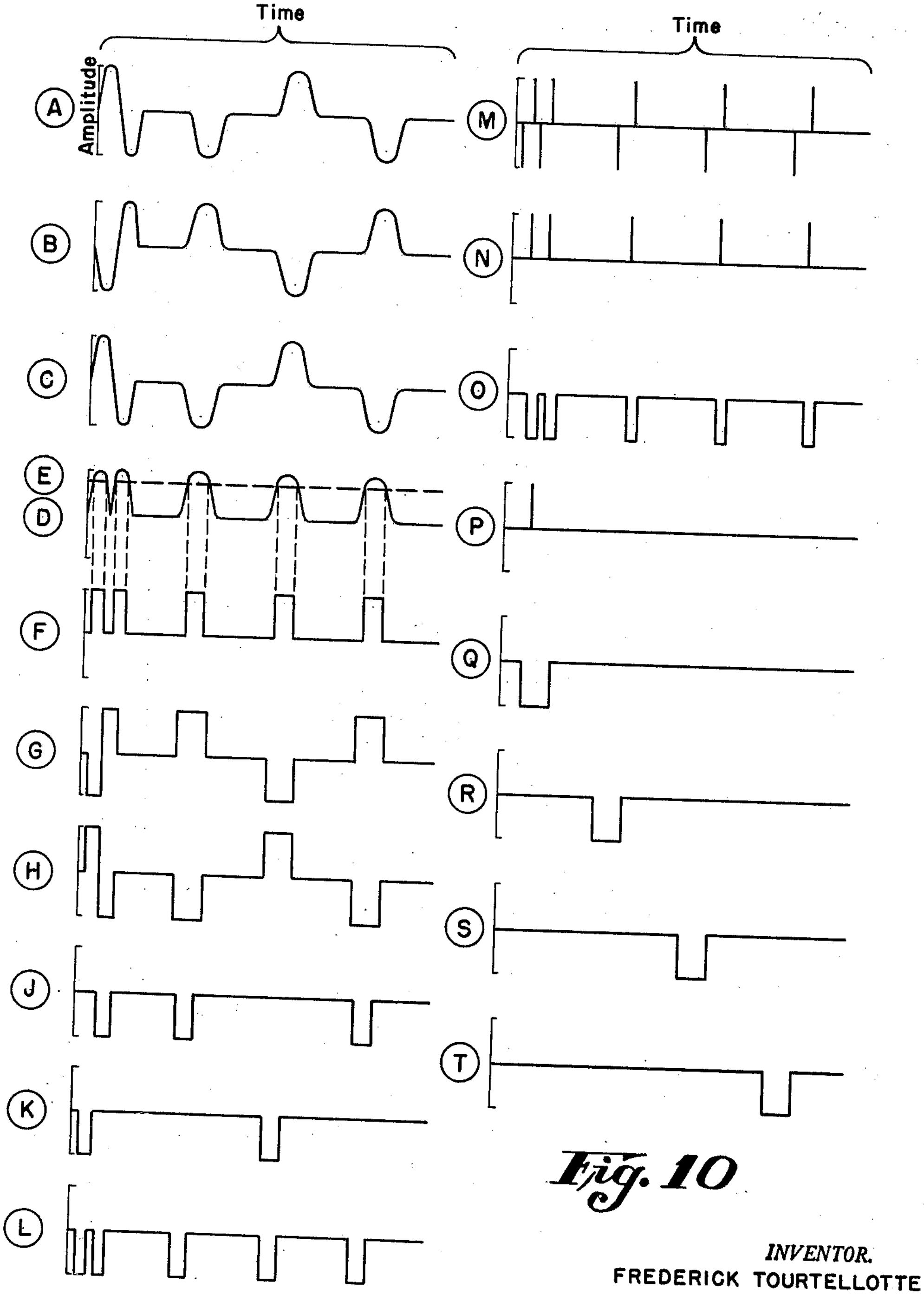
FIG. 10 is a graph representing the amplitude-time characteristics or wave forms of signals at various points in the system to aid in explaining the operation thereof.

Referring now more particularly to FIG. 3 of the drawings, the receiver 14 of FIG. 2 is represented in greater detail and comprises an amplifier 30 coupled to the secondary winding 12 of the rotating transformer which supplies a coded pulse train, for example, as represented by curve A of FIG. 10 and corresponding to the magnetized regions or code on the bead wire. The output circuit of the amplifier 30 is coupled to a phase splitter 31, 32 or push-pull circuit for deriving pulses of opposite polarity at the anodes of tubes 31, 32 corresponding to the coded pulse train. The output signals of the phase splitter 31, 32 are applied through cathode followers 33, 34 to the channel selector 15 of FIG. 2 to develop pulses represented by curves B and C, respectively.

The output signals of a phase splitter 31, 32 are also applied to full wave rectifier 35, 36 to develop at the cathodes of tubes 35, 36 pulses represented by curve D of FIG. 10.

The rectified output pulses of the full wave rectifier are applied through a filtering stage including tube 37 to derive across potentiometer 38 a direct-current or average voltage proportional to the magnitude of the rectified pulses. A portion of this voltage represented by curve E is applied to a tube 39. The rectified signal represented by curve D is applied to tube 40. In the cathode circuits of the tubes 39 and 40 is a current-limiting stage **41*a* which maintains a substantially constant current flow along conductor 42*a*. This current flow normally flows through tube 39 but when the positive rectified signal represented by curve D applied to tube 40 is more positive than the level represented by curve E and applied to tube 39, the current flow along conductor 42*a* is switched from tube 39 to tube 40 and tube 39** then becomes non-conductive.

The anodes of tubes 39 and 40 are connected to the inputs of a bi-stable multivibrator 41, 42 in which the tube 41 is normally non-conductive. When the rectified pulses applied to the grid of tube 40 exceed the D.C. potential applied to the grid of tube 39, tube 40 becomes conductive, causing the tube 42 to become non-conductive and tube 41 to be conductive. When the rectified pulses applied to the grid of tube 40 again fall below the D.C. potential applied to the grid of tube 39, tube 39 becomes conductive again, causing the tube 41 to become non-conductive and the tube 42 to become conductive. Accordingly, rectangular positive pulses, represented by curve F, corresponding to the input pulses are derived at the anode of tube 42 and applied through cathode follower 43 to the channel selector 15 of FIG. 2.

Figure 4:
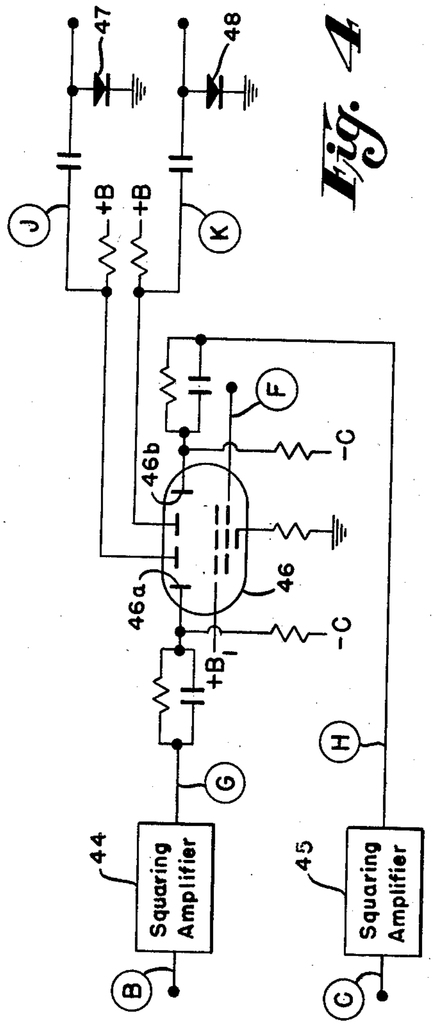
FIG. 4 is a circuit diagram, partly schematic, of a channel selector portion of the FIG. 2 decoding apparatus.

Referring now more particularly to FIG. 4 of the drawings, squaring amplifiers 44 and 45, which may be overdriven amplifiers of conventional construction, are coupled to cathode followers 33 and 34 respectively of FIG. 3. The amplifiers 44 and 45 derive from the signals represented by curves B and C, respectively, the signals represented by curves G and H, respectively.

The output circuits of the squaring amplifiers 44 and 45 are coupled to beam-switching electrodes **46*a*, 46*b* of a beam-switching tube of conventional type. The control grid of the beam-switching tube 46 is coupled to the cathode follower 43** of the FIG. 3 receiver which applies the signal represented by curve F thereto to render the tube conductive during the occurrence of the pulses of curve F.

The beam-switching tube is effective to derive in its output circuits negative pulses represented by curves J and K. The pulses represented by curve J occur during the intervals of positive peaks of the pulses represented by curve G. The pulses represented by curve K occur during the intervals of positive peaks of the pulses represented by curve H. The output pulses of curves J and K represent in individual channels the South-North pulses and the North-South pulses, respectively, of the code being translated. These pulses are applied across diode clamps 47, 48 to the AND circuits 20, 21, respectively.

Figure 5:
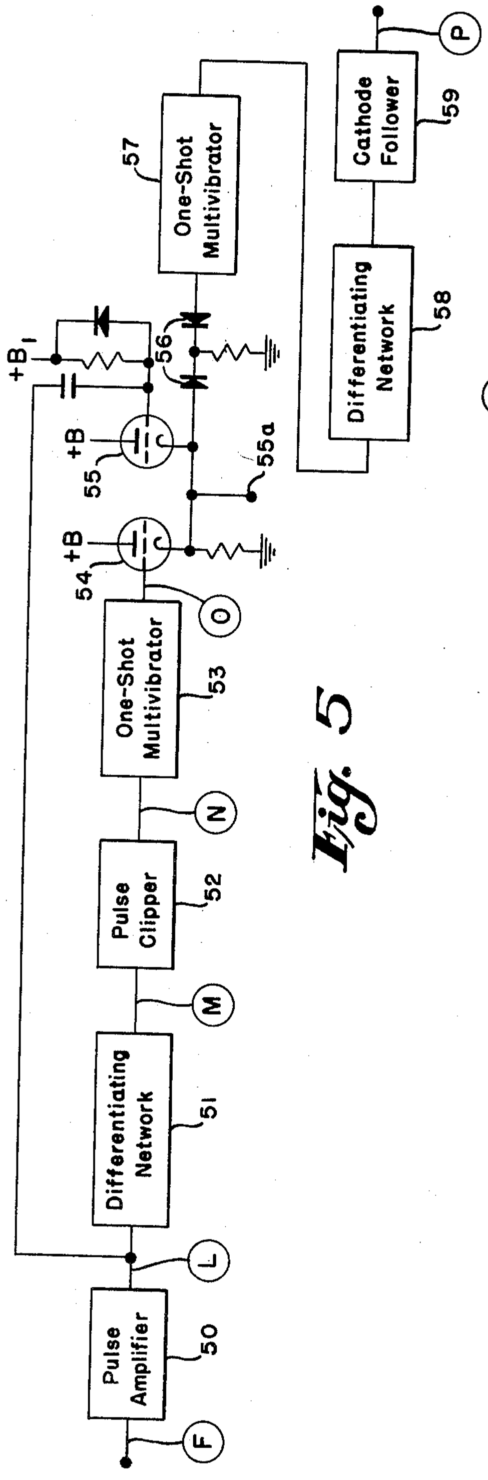
FIG. 5 is a circuit diagram, partly schematic, of an index-pulse detector portion of the FIG. 2 decoding apparatus.

FIG. 5 of the drawings represents the index-pulse detector comprising a pulse amplifier 50 having its input circuit connected to the cathode follower 43 of FIG. 3. The output circuit of the pulse amplifier, supplying code pulses represented by curve L, is coupled to a differentiating network 51 for deriving positive and negative pulses, represented by curve M, from the leading and trailing edges of the code pulses of curve L. The pulses derived by the differentiating network 51 are applied to a pulse clipper 52 which develops output pulses of positive polarity, represented by curve N. These pulses are applied to a one-shot multivibrator 53 for developing negative pulses represented by curve O and applied to the input circuit of tube 54.

An input circuit of tube 55 is coupled to the output circuit of the pulse amplifier 50. The output pulses of the one-shot multivibrator 53 are delayed, by a time interval equal to the duration of approximately one half of the full indexing digit, with respect to the output pulses of the pulse amplifier 50. Thus, during the occurrence of the indexing pulse there is a substantial time coincidence between the pulses of curve L supplied by pulse amplifier 50 and the output pulses represented by curve O of the one-shot multivibrator 53. The first portion of the indexing pulse of curve O delayed by the one-shot multivibrator 53 occurs in substantial time coincidence with the undelayed second portion of the indexing pulse of curve L developed by the pulse amplifier 50.

As will be explained more fully hereinafter, there is also applied to the cathode circuit of the tubes 54, 55, a negative keying pulse having a duration of, for example, $\frac{1}{60}$ second. During this time interval a negative pulse corresponding to the indexing pulse is translated by the diode network 56 to the input circuit of a one-shot multivibrator 57. The one-shot multivibrator 57 develops a positive output signal which is converted to a positive trigger pulse through a differentiating network 58 and is supplied as represented by curve P through a cathode follower 59 to the commutator.

Figure 6:
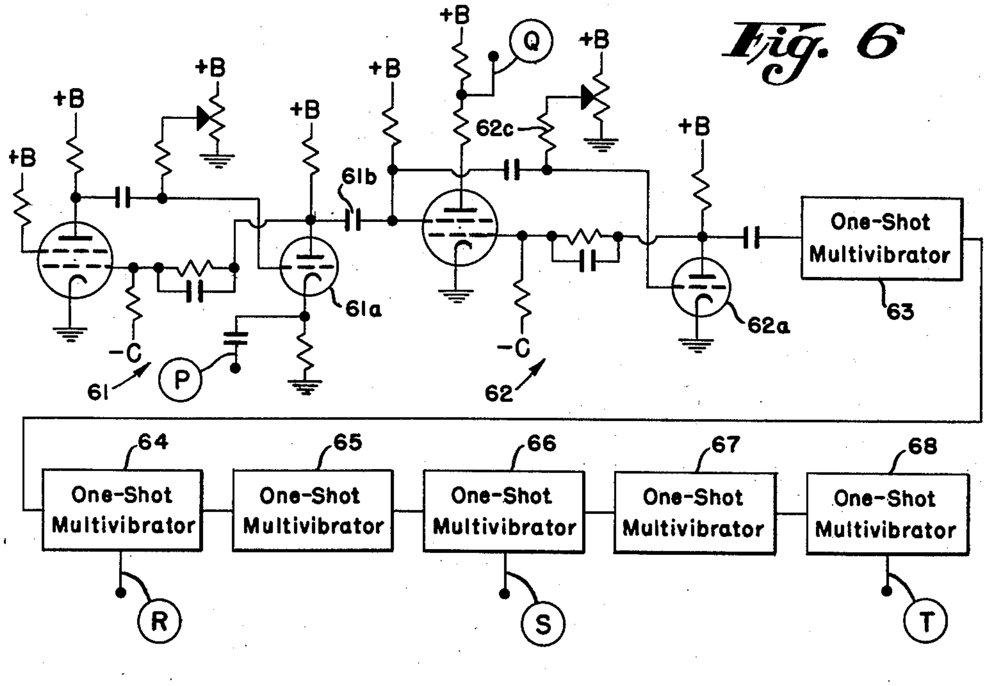
FIG. 6 is a circuit diagram, partly schematic, of a commutator portion of the FIG. 2 decoding apparatus.

Referring now more particularly to FIG. 6 of the drawings the commutator of the apparatus may comprise a series of one-shot multivibrator 61–68, inclusive, for developing four sequential negative output pulses as represented by curves Q–T, inclusive, corresponding to the occurrence times of the code pulses. The first output pulse, represented by curve Q, corresponds substantially to the occurrence time of the second portion of the index signal represented by the commutator trigger pulse P derived by the index pulse detector of FIG. 5. The remaining output pulses, represented by curves R, S, T, correspond to the occurrence times of the other three code pulses on the bead wire. The commutator trigger pulse P is effective to render non-conductive the normally conductive tube **61*a* to initiate the sequential triggering or clock operation of the multivibrators. The coupling condenser 61*b* between multivibrators 61 and 62 is effective with the grid resistor 62*c* to differentiate the output pulse of the multivibrator 61 to provide a negative pulse at the end of the cycle of the multivibrator 61 which triggers the multivibrator 62 by rendering tube 62*a*** non-conductive. The potentiometers in each multivibrator circuit may be adjusted to control precisely the timing of the output pulses.

Figure 7:
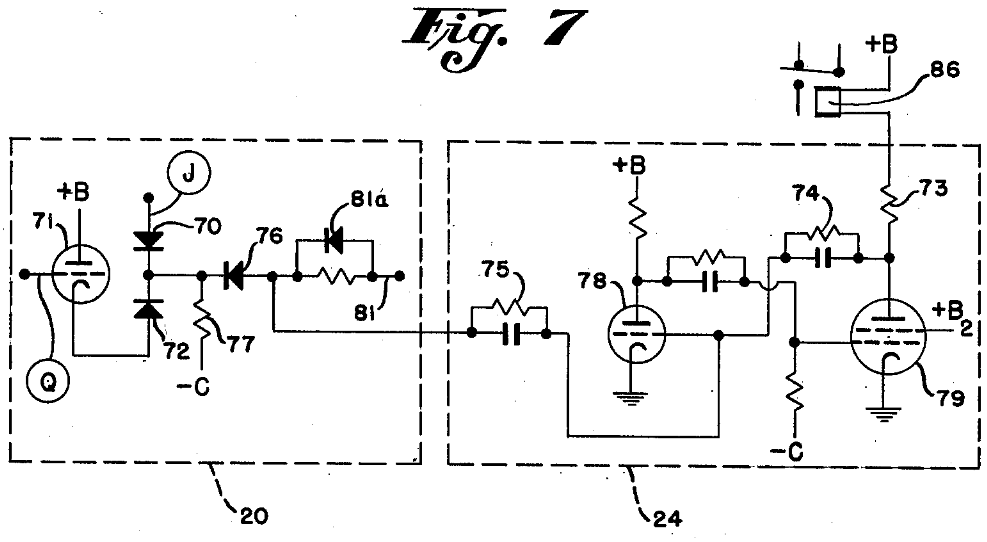
FIG. 7 is a circuit diagram of a logic and memory circuit of the FIG. 2 apparatus.

Referring now more particularly to FIG. 7 of the drawings, the AND circuit 20 and the memory circuit 24 are represented in detail. The memory circuit 24 is a bistable multivibrator or Eccles-Jordan "flip-flop" circuit. A negative pulse, represented by curve Q, from the commutator is applied through diode 70 to the AND circuit. Negative pulses, represented by curve J, from the channel selector are applied through cathode follower 71 and diode 72 to render the diode non-conductive. When the diodes 70 and 72 are simultaneously rendered non-conductive during the occurrence of the pulse represented by curve Q, more current flows from the source +B through relay 86, resistor 73, resistor 74, resistor 75, diode 76, and resistor 77 to the source −C to drive normally conductive tube 78 into its non-conductive state and to render tube 79 conductive, energizing the relay 86. The relay 86 remains energized until a positive reset pulse is applied at terminal 81 through diode 81*a* to the grid circuit of tube 78 from the control unit to be described subsequently.

Referring now more particularly to FIG. 8, the contacts of relay 86 are represented by corresponding reference numerals and are shown in the condition corresponding to the normally deenergized condition of the relay. The other memory units 25, 26, 27 of FIG. 2 include additional relays corresponding to the relay 86 and the contacts of those relays are designed as corresponding to relays 83, 84, 85, respectively. When the relays are energized, the contacts change position in accordance with the code and any combination of two of the four relays may be energized simultaneously in accordance with the code. For example, when relay 86 is energized, relay 84 may also be energized to represent the numeral 3 on the indicating lamp as a result of current flow through the contacts 86*f* and 85*e*. This numeral corresponds to the first two digits of the code and the second two digits, which may, for example, represent the numeral 4, control the actuation of a similar bank of indicating lamps in accordance with the information derived by the logic and memory unit 18.

Information on the other bead wire may be derived in a similar manner in logic and memory units 17*a* and 18*a* to represent two additional numerals.

Referring now more particularly to FIG. 9 of the drawings, control unit 89 of FIG. 2 is represented schematically as including a suitable pulse microswitch 90 of conventional construction positioned along the tire conveyor and actuated by the tire to develop a negative pulse as the tire passes the switch. The derived negative pulse is utilized to trigger a one-shot multivibrator 91 for developing a negative pulse having a duration of approximately of $\frac{1}{60}$ second sufficient to allow a complete revolution of the pick-up head over the tire. This pulse is amplified in amplifier 92 and causes conduction through tube 95, energizing relay 96 which opens its contacts 96*a* and 96*b*. When contacts 96*a* open, a negative pulse having a duration of approximately $\frac{1}{60}$ second is developed at the output circuit of tube 97 which is applied to the index-pulse detector at terminal 55*a* to enable the detector to respond to the index signal. The negative pulse is also amplified and inverted through tube 98 and causes Thyratron tube 99 to conduct until condenser 100 is discharged to supply a positive pulse at terminal 81. This pulse is utilized as a reset pulse in the logic and memory units to cause the tube 78 of FIG. 7 to be conductive at the initiation of the cycle. A degenerative feedback condenser 101 preferably is included for stabilization.

From the foregoing description, it will be apparent that a system constructed in accordance with the invention has the advantage of being capable of translating several thousand or more digital code combinations representing manufacturing information.

While there has been described what is at present believed to be preferred embodiment of the invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. Apparatus for decoding a digital magnetic code including an indexing digit and information digits disposed circumferentially around a tire axis at a radial distance therefrom on a member of a tire comprising: magnetic pick-up means rotatable circumferentially of the tire around the tire axis at a radial distance from the tire axis approximately equal to the radial distance of the code digits from the tire axis and rotatable in proximity to the tire member for developing electrical code pulses representative of the magnetic code including the indexing digit and the information digits; indexing-digit detector means; a transformer having a rotatable primary winding coupled to said pick-up means and having a secondary winding; means for rotating said pick-up means and said primary winding to translate said electrical code pulses to said secondary winding; said secondary winding being coupled to said indexing-digit detector means for translating said electrical code pulses representative of the information digits and the indexing digit to said indexing-digit detector means; means coupled to said indexing-digit detector means for developing timing pulses; said indexing-digit detector means being selectively responsive to those of said code pulses which are representative of the indexing digit for actuating said timing-pulse developing means for developing timing pulses representative of the occurrence times of those of said code pulses representative of the information digits; and circuit means coupled to said secondary winding and to said timing-pulse developing means and responsive to said electrical code pulses and to said timing pulses for separating said code pulses to represent individually the information digits of the magnetic code and for storing said separated pulses to represent the code.

2. Apparatus for decoding a digital code including an indexing digit and information digits spaced circumferentially around a tire axis at a radial distance therefrom on members of a tire on opposite sides of the tire comprising: a pair of synchronously rotatable pick-up means disposed on opposite sides of the tire and rotatable circumferentially of the tire around the tire axis at a radial distance from the tire axis approximately equal to the radial distance of the code digits from the tire axis and rotatable in proximity to the coded members for developing electrical code pulses representative of the digital code including information digits and the indexing digit; indexing-digit detector means; rotatable means coupled to said pair of pick-up means and to said indexing-digit detector means for translating said electrical code pulses representative of the information digits and the indexing digit to said indexing-digit detector means; means for rotating said pair of pick-up means and said pulse-translating means synchronously; means coupled to said indexing-digit detector means for developing timing pulses; said indexing-digit detector means being selectively responsive to those of said code pulses which are representative of the indexing digit for actuating said timing-pulse developing means for developing timing pulses representative of the occurrence times of those of said code pulses representative of the information digits; and circuit means coupled to said rotatable pulse-translating means and to said timing-pulse developing means and responsive to said electrical code pulses and to said timing pulses for separating said code pulses to represent individually the information digits of the magnetic code and for storing said separated pulses to represent the code.

3. Apparatus in accordance with claim 2 for decoding a digital magnetic code including an indexing digit and information digits spaced circumferentially around bead wires of a tire on opposite sides of the tire at a radial distance from the tire axis equal to the radius of the bead wires with respect to the tire axis in which said pick-up means are rotatable circumferentially of the tire around the axis of the tire at a radial distance from the tire axis approximately equal to the radius of the bead wires with respect to the tire axis, in which said pick-up means are rotatable in proximity to the tire bead wires, in which said rotatable pulse-translating means comprises a pair of transformers having synchronously rotatable primary windings coupled to said pick-up means and having secondary windings, and in which said secondary windings are coupled to said indexing-digit detector means and to said circuit means for separating and storing code pulses.

References Cited by the Examiner

UNITED STATES PATENTS

| | | | |
|---|---|---|---|
| 2,628,572 | 2/53 | Le Goff | 324—34 |
| 2,817,701 | 12/57 | Johnson | 340—174.1 |
| 2,914,746 | 11/59 | James | 340—149 |
| 2,920,674 | 1/60 | Bull | 152—362 |
| 2,926,341 | 2/60 | Scarbrough | 340—174.1 |
| 2,981,830 | 4/61 | Davis et al. | 340—174.1 |
| 2,989,735 | 6/61 | Gumpertz | 324—34 |

FOREIGN PATENTS

| | | |
|---|---|---|
| 800,190 | 8/58 | Great Britain. |

IRVING L. SRAGOW, *Primary Examiner.*

STEPHEN W. CAPELLI, *Examiner.*